(12) United States Patent
Chung et al.

(10) Patent No.: US 9,279,884 B2
(45) Date of Patent: Mar. 8, 2016

(54) METHOD AND DEVICE FOR ESTIMATING DIRECTION OF ARRIVAL

(71) Applicant: National Chiao Tung University, Hsinchu (TW)

(72) Inventors: Shyh-Jong Chung, Hsinchu (TW); Jen-Hao Cheng, Hsinchu (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 201 days.

(21) Appl. No.: 13/917,400

(22) Filed: Jun. 13, 2013

(65) Prior Publication Data

US 2014/0159945 A1    Jun. 12, 2014

(30) Foreign Application Priority Data

Dec. 11, 2012  (TW) .............................. 101146594 A

(51) Int. Cl.
*G01S 3/28* (2006.01)
*G01S 3/74* (2006.01)
*G01S 13/44* (2006.01)
*G01S 13/93* (2006.01)

(52) U.S. Cl.
CPC ............ *G01S 13/44* (2013.01); *G01S 13/4445* (2013.01); *G01S 13/4454* (2013.01); *G01S 13/4463* (2013.01); *G01S 3/28* (2013.01); *G01S 3/74* (2013.01); *G01S 13/931* (2013.01)

(58) Field of Classification Search
CPC .. G01S 3/14–3/44; G01S 13/42; G01S 13/44; G01S 13/4445; G01S 13/4454; G01S 13/4463
USPC .................................. 342/147–158, 175, 195
See application file for complete search history.

(56) References Cited

U.S. PATENT DOCUMENTS

| 3,657,547 | A  | * | 4/1972  | Mansfield ................. 250/208.3 |
| 5,371,506 | A  | * | 12/1994 | Yu et al. ........................ 342/380 |
| 5,600,326 | A  | * | 2/1997  | Yu et al. ......................... 342/17 |
| 6,618,008 | B1 | * | 9/2003  | Scholz .......................... 342/427 |
| 7,576,682 | B1 | * | 8/2009  | Yu .................................. 342/90 |
| 7,671,789 | B1 | * | 3/2010  | Yu ................................. 342/152 |
| 2003/0020646 | A1 | * | 1/2003 | Yu .................................. 342/17 |
| 2003/0085833 | A1 | * | 5/2003 | Yu .................................. 342/17 |
| 2004/0046695 | A1 | * | 3/2004 | Brothers et al. ............. 342/427 |
| 2007/0018882 | A1 | * | 1/2007 | Manoogian et al. ........... 342/80 |
| 2007/0285315 | A1 | * | 12/2007 | Davis et al. .................. 342/377 |
| 2008/0042896 | A1 | * | 2/2008 | Alon et al. .................... 342/174 |
| 2010/0123617 | A1 | * | 5/2010 | Yu et al. ....................... 342/149 |
| 2011/0248796 | A1 | * | 10/2011 | Pozgay ......................... 333/137 |
| 2012/0098694 | A1 | * | 4/2012 | Hansen ......................... 342/154 |
| 2012/0268313 | A1 | * | 10/2012 | Shimizu et al. .............. 342/107 |
| 2012/0268314 | A1 | * | 10/2012 | Kuwahara et al. ........... 342/147 |
| 2013/0106647 | A1 | * | 5/2013 | Yu ................................. 342/113 |

* cited by examiner

*Primary Examiner* — Peter Bythrow
(74) *Attorney, Agent, or Firm* — Muncy, Geissler, Olds & Lowe, P.C.

(57) ABSTRACT

A method for determining a DOA (Direction of Arrival) comprises the following steps: (a) providing at least two antennas arranged with a squint angle; (b) producing at least two base beams; (c) every two virtual beams of the multiple virtual beams which cross together at a specific angle are define to a virtual beam set; (d) synthesizing the two virtual beams of each one of the virtual beam sets to be a monopulse; and (e) determining the DOA of the object according to comparison between magnitude of demodulated signals corresponding to the monopulses. A device for estimating a DOA is also disclosed.

15 Claims, 5 Drawing Sheets

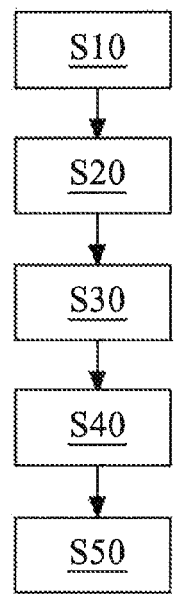
Fig. 1
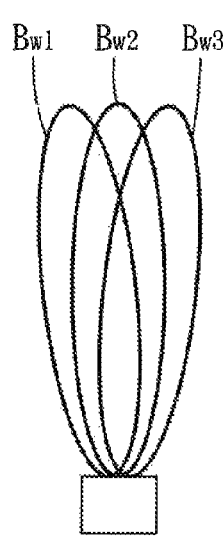 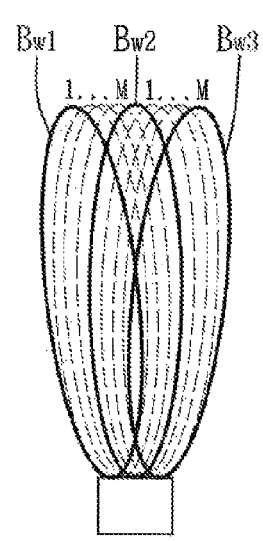 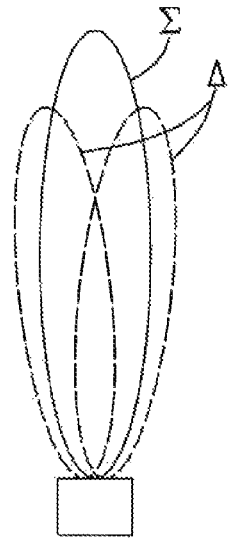
Fig. 2a   Fig. 2b   Fig. 2c

METHOD AND DEVICE FOR ESTIMATING DIRECTION OF ARRIVAL

BACKGROUND OF THE INVENTION

1. Field of the Invention

The present invention relates to a method and device for estimating DOA, and more particularly to a method and a device of vehicle radar for estimating DOA.

2. Description of the Prior Art

Nowadays, radar has been widely applied to the field of tracking or searching targets. In order to increase accuracy of target tracking, detection errors of radar needs to be reduced. To achieve this goal, industrial and academic circles propose different solutions to improve the accuracy of radar detection.

There are many DOA methods proposed such as conventional digital beamforming, Capon's beamforming and Multiple Signal Classification (MUSIC) algorithm. In general, the Capon algorithm uses Minimum Variance Distortion Less Response (MVDR) to estimate DOA of the reflected signals. The MUSIC algorithm utilizes an antenna array. The basic concept of MUSIC algorithm is: the autocorrelation matrix of the reflected signal is decomposed to signal sub-space and noise sub-space, and it uses the feature of orthogonality between these two sub-spaces to estimate the DOA of the reflected signal.

However, the known Capon's beamforming and conventional digital beamforming algorithm needs more antennas to achieve better resolution in detecting more targets. In addition, the MUSIC algorithm can distinguish many targets with high angular resolution, but the number of the targets detected is limited due to the characteristics of the methodology. As a result, more antennas need to be applied for detecting more targets under this method. Therefore, these above-mentioned algorithms need to be improved in practical.

SUMMARY OF THE INVENTION

The present invention proposes a method and a device for DOA, which utilizes digital beamforming and monopulse technique to increase angular resolution without adding extra antennas.

In one embodiment of the present invention, the proposed method is for estimating DOA of an object, which comprises the following steps: (a) providing at least two antennas arranged with a squint angle, and the antennas produce at least two base beams; (b) utilizing a digital beamforming module for producing multiple virtual beams between every two adjacent base beams; (c) every two virtual beams of the multiple virtual beams which cross together at a specific angle are defined to a virtual beam set, wherein the two virtual beams are at an interval of one virtual beam; (d) utilizing a monopulse synthesizer for synthesizing the two virtual beams of each one of the virtual beam sets to be a monopulse; and (e) utilizing a processing unit for determining the DOA of the object according to comparison between amplitudes of demodulated signals corresponding to the monopulses.

In another embodiment of the present invention, the device for estimating a DOA of an object, which comprises at least two antennas, a digital beamforming module, a monopulse synthesizer and a processing unit. The antennas are arranged with a squint angle, which produce at least two base beams. The digital beamforming module is for producing multiple virtual beams between every two adjacent base beams, every two virtual beams of the multiple virtual beams which cross together at a specific angle are defined to a virtual beam set, wherein the two virtual beams are at an interval of one virtual beam. The monopulse synthesizer is for synthesizing the two virtual beams of each virtual beam set to create a monopulse. The processing unit is for determining the DOA of the object according to comparison of magnitude of demodulated signals corresponding to the monopulses.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein:

FIG. 1 is a flow diagram schematically illustrating the steps according to an embodiment of the present invention;

FIG. 2a is a diagram schematically illustrating antennas according to an embodiment of the present invention;

FIG. 2b is a diagram schematically illustrating virtual beams produced between every two adjacent antennas according to an embodiment of the present invention:

FIG. 2c is a diagram schematically illustrating a sum pattern and a difference pattern according to an embodiment of the present invention;

DESCRIPTION OF THE PREFERRED EMBODIMENT

The detailed explanation of the present invention is described as follows. The described preferred embodiments are presented for purposes of illustrations and description, and they are not intended to limit the scope of the present invention.

Referring FIG. 1, it shows the flow diagram of an embodiment of the present invention. A method for estimating direction of arrival (hereinafter abbreviated as DOA) according to an embodiment of the present invention comprises the following steps:

Step 10: providing at least two antennas arranged with a squint angle;

Step 20: utilizing a digital beamforming module for producing at least two base beams between two adjacent base beams;

Step 30: every two virtual beams of the multiple virtual beams which cross together at a specific angle are define to a virtual beam set;

Step 40: utilizing a monopulse synthesizer for synthesizing the two virtual beams of each virtual beam set to create a monopulse; and Step 50: utilizing a processing unit for determining the DOA of the objects according to comparison of the magnitudes of the demodulated signals corresponding to the monopulses.

Continue the above description, for ease of presentation, steps 10 and 20 are depicted with FIGS. 2a, 2b. As shown in FIG. 2a, the embodiment of the present invention has N antennas, for example N=3, then the 3 antennas produce 3 base beams (such as Bw1, Bw2 and Bw3). Next, as shown in FIG. 2b, producing M virtual beams between the two adjacent base beams (such as between $B_{w1}$ and $B_{w2}$, $B_{w2}$ and $B_{w3}$) by utilizing concept of beamforming. The variable M which is a positive integer determines the number of the virtual beams. The variable M can be designed based on these configurations (such as the squint angle between the antennas, the number of antennas, and desired better angular resolution). For example, a greater squint angle between the antennas can cover a wider detection range, thus larger variable M is used for achieving better angular resolution under the wider detection range. In this embodiment shown in FIG. 2b, the variable M=3 represents that there are 3 virtual beams shifting equidistantly between the two adjacent base beams ($B_{w1}$, $B_{w2}$ and $B_{w2}$, $B_{w3}$).

Figure 3:
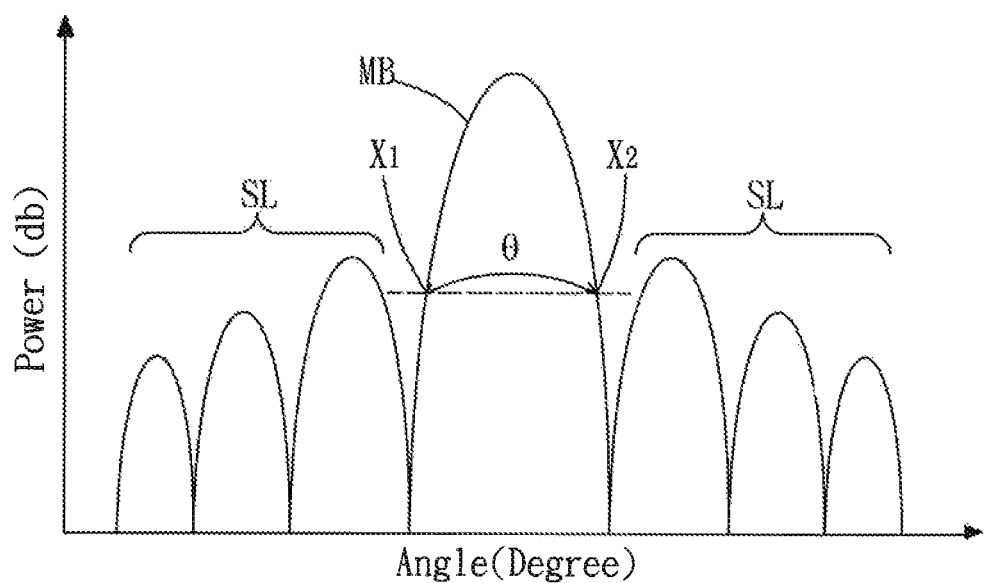
FIG. 3 is a diagram schematically illustrating a radiation pattern according to an embodiment of the present invention.

Continue the above description, in one embodiment of the invention, multiple virtual beams are formed according to beamwidth and the squint angle of the two adjacent base beams ($B_{w1}$, $B_{w2}$ and $B_{w2}$, $B_{w3}$). Different weightings are applied to the base beams to form the multiple virtual beams according to the above characteristics, wherein the beamwidth of base beam means the base beam's half-power beamwidth (HPBW). As shown in FIG. 3, antenna radiation pattern of the base beam has a main beam (MB) and several sidelobes (SL), the angle of two half-power point $X_1 \cdot X_2$ is defined as the beamwidth θ. In principle, the angular resolution is decided by beamwidth θ, that is, the smaller beamwidth θ is, the better angular resolution is achieved for detecting and distinguishing the targets. Therefore, the different weightings are applied to the base beams to form M virtual beams according to the characteristics such as beamwidth θ and the squint angle of the two adjacent base beams. In one embodiment, the weighting refers to a weighting table which is composed of a plurality of weighting factors. The weighting factors can be calculated in advance or be a certain value computed by previous or similar base beams, thereby shortening computing time in calculating weighting factors.

An example is given to illustrate a number of the virtual beams in the step 10, if the number of antennas is N and the variable number of the multiple virtual beams produced between two adjacent base beams is M. The total number of the multiple virtual beams is K, wherein K=(N−1)×M where N, M and K are positive and N≥2, N represents the number of the base beams and M represents the variable number of the multiple virtual beams produced between two adjacent base beams. As shown in FIG. 2b, 3 antennas produce 3 base beams, thus there are 2 sets of adjacent base beams ($B_{w1}$, $B_{w2}$ and $B_{w2}$, $B_{w3}$). If 3 virtual beams are produced by each set of two adjacent base beams, there will be 6 virtual beams[M=3, N=3, and K=(3−1)×3=6]

With continuing reference to FIG. 1, K virtual beams need to be calibrated to make each virtual beam has equal peak gain. Next, choose every two virtual beams of the multiple virtual beams which cross together at a specific angle as a virtual beam set. For example, the $k^{th}$ and $(k+2)^{th}$ virtual beams cross together at a specific angle [k is from 1 to (K−2), such as first virtual beam and third virtual beam will cross together at specific angle. Second and fourth beam will also cross at another angle, and so on]. The $k^{th}$ and $(k+2)^{th}$ virtual beams are defined to a virtual beam set (step 30), thus there are (K−2) virtual beam sets are produced. In step 40, after K virtual beams have been defined to (K−2) virtual beam sets, two virtual beams of each virtual beam set are synthesized to a sum pattern (Σ) and difference pattern (Δ). Antenna radiation pattern as shown in FIG. 2c, the solid line represents sum pattern (Σ) and the dotted line represents difference pattern (Δ). Then, utilizing the quasi-monopulse technique to get (K−2) pairs of sum pattern (Σ) and difference pattern (Δ), synthesizing (K−2) monopulses by calculating the magnitude ratio of (K−2) pairs of sum pattern (Σ) to difference pattern (Δ).

It is noted in step 20, among in K virtual beams, the $k^{th}$ and $(k+2)^{th}$ virtual beams are used for synthesizing monopulses. With regard to radiation of virtual beam, it is not limed to kth and $(k+2)^{th}$ virtual beams can be synthesized to monopulse. If the monopulse is synthesized by kth and $(k+1)^{th}$ virtual beam, it will cause mutual interference especially with greater beamwidth θ thereof. On the contrary, if the monopulse is synthesized by $k^{th}$ and $(k+n, n≥3)^{th}$ virtual beam, the number of the monopulse will be less, thus more virtual beams between the two adjacent base beams have to be produced to achieve better angular resolution. For example, kth and $(k+2)^{th}$ virtual beams can be used for synthesizing K monopulses, kth and $(k+3)^{th}$ only can be used for synthesizing (K−3) monopulses. The number of the monopulse determines the angular resolution. Therefore, more virtual beams have to be produced to achieve better angular resolution, which results in more computation. The DOA method of the invention select $k^{th}$ and $(k+2)^{th}$ virtual beams, which achieves better angular resolution and less computation.

Figure 4:
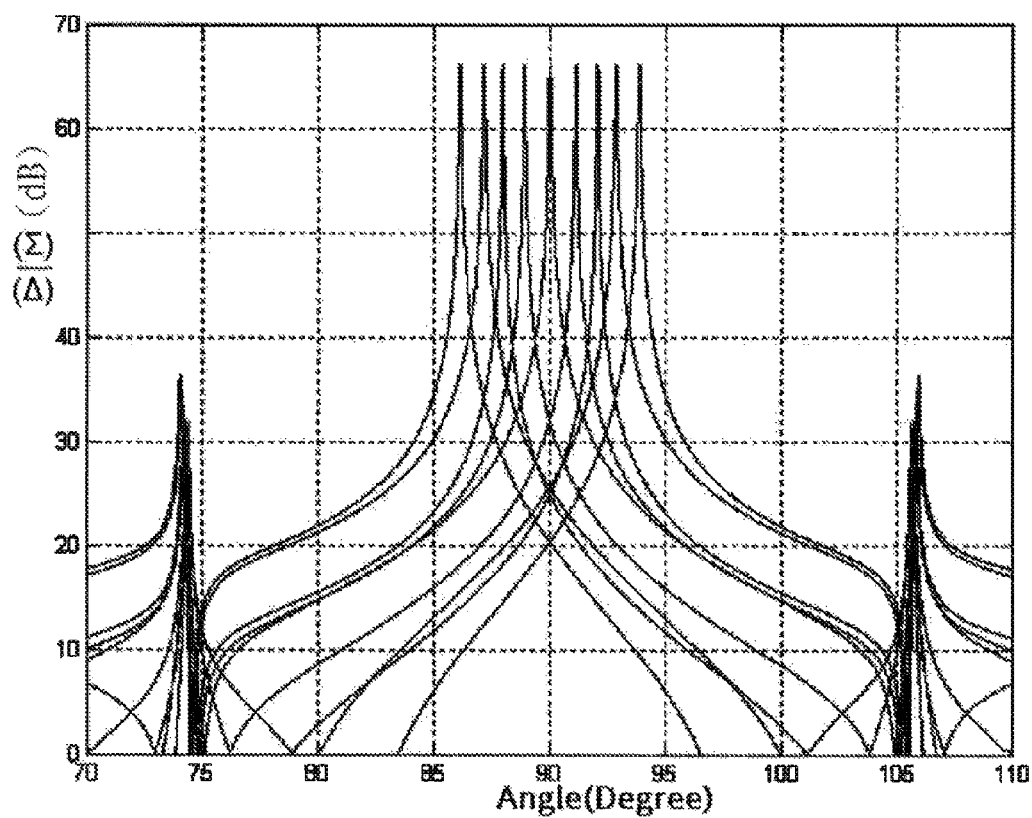
FIG. 4 is a diagram schematically illustrating a radiation pattern of 9 monopulses according to an embodiment of the present invention.

Referring FIG. 4, it represents 11 virtual beams (K=11) can be defined to 9 virtual beam sets (K−2=9). As shown in central area of FIG. 4, the 9 monopulses are synthesized by calculating the ratio of the sum pattern to the difference pattern (Σ/Δ). As shown in two sides of FIG. 4, side beams with lower level are produced by the ratio (τ/Δ) of 9 sidelobes of the 9 virtual beam sets. By utilizing monopulse technique, the ratio of sum pattern to difference pattern (Σ/Δ), it can dramatically reduce sidelobe level (SLL). When SLL is over 20 dB below than monopulse level, it can suppress noise disturbance which is not within detection region thereby ensuring the capability of detection. In the FIG. 4, SSL is over than 30 dB below monopulse level.

Continue the above description, if anyone of the (K−2) synthesized monopulses detects an object, the monopulse corresponding to its demodulated signals will have maximum power ratio. That is, the monopulse points toward the DOA of the object.

Figure 5A:
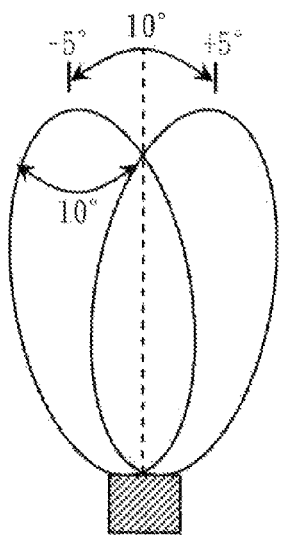
FIG. 5a is a diagram schematically illustrating an antenna and its two base beams according to an embodiment of the present invention.
Figure 5B:
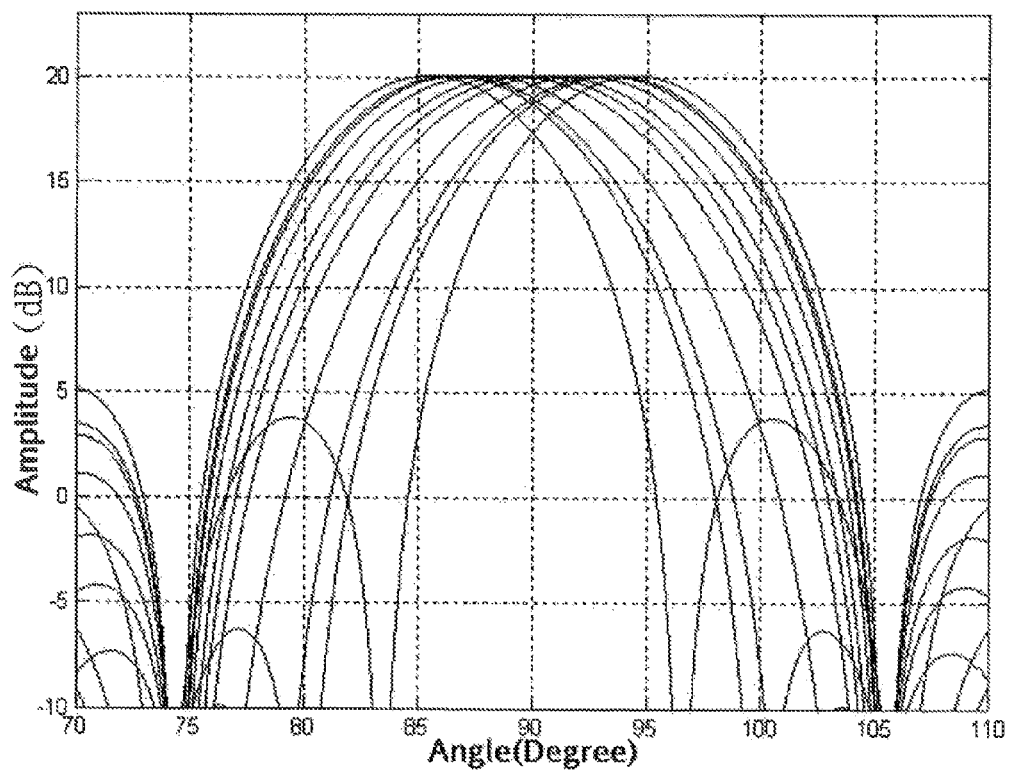
FIG. 5b is a diagram schematically illustrating radiation pattern of 11 virtual beams according to an embodiment of the present invention.

Another embodiment of the present invention illustrates above steps, referring FIG. 5a, FIG. 5b and FIG. 4. As shown in FIG. 5a, providing at two antennas arranged with a squint angle, one antenna pointing at +5 degree, the other pointing at −5 degree, the coverage between the two antennas is 9 degree. In this embodiment, to achieve 1° angular resolution, 11 virtual beams are required. As shown in FIG. 5b, designed weighting applied to these virtual beams, which makes each virtual beam is symmetric with the same distance to one another. Each virtual beam is calibrated to have equal peak gain. The 11 virtual beams are produced between the two adjacent base beams, wherein the first virtual and the third virtual beams, the second and the fourth virtual beams, . . . the $9^{th}$ and $11^{th}$ virtual beams, every two virtual beams will also cross at specific angle to form 9 virtual beam sets. And then, using quasi-monopulse technique, the 9 virtual beam sets constitute 9 pairs of sum patterns (Σ) and difference patterns (Δ) by computing the ratio of sum pattern to difference pattern ($\Sigma/\Delta$). The 9 monopulses pointing at the detection region from +4° to −4° to provide 1° angular resolution capability.

Figure 6:
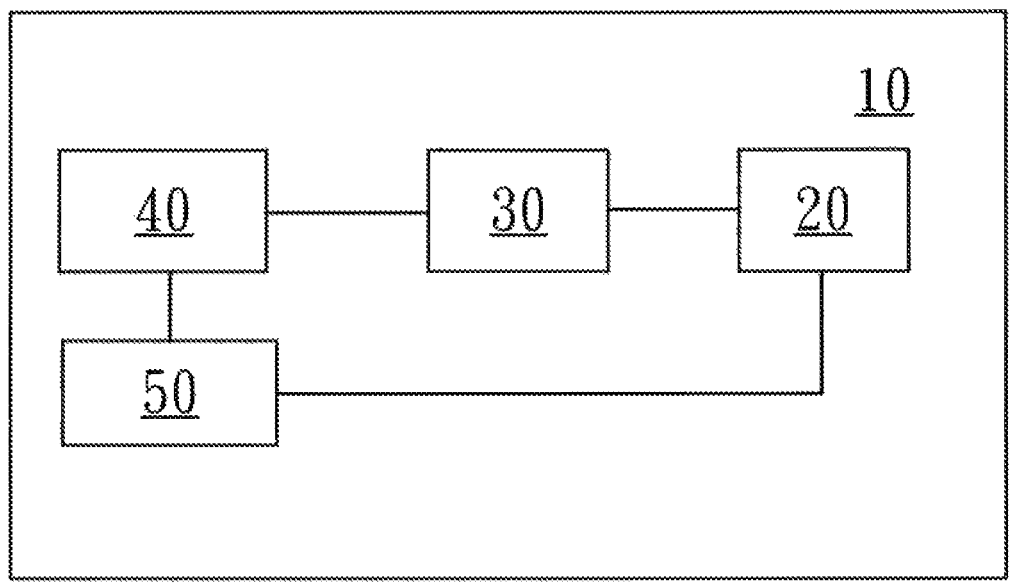
FIG. 6 is a block diagram illustrating a device for estimating DOA according to another embodiment of the present invention.

Referring FIG. 6, a device for estimating DOA 10 of another embodiment is for detecting an angle of an object in front. The device for estimating DOA 10 comprises at least two antennas 20, digital beam forming module 30, monopulse synthesizer 40, and processing unit 50. The device for estimating DOA 10 is for implementing above method to estimate DOA of the object. The multiple antennas 20 are arranged with a squint angle, and the antennas 20 produce at least two base beams. The digital beamforming module 30 is for producing multiple virtual beams between the two adjacent base beams. Two base beams and multiple virtual beams are shifting equidistantly at the same time because of the squint angle between multiple antennas 20.

In one embodiment, digital beamforming module 30 applies a different weighting to the two base beams according to beamwidth θ and the squint angle of the two base beams, wherein the weighting refers to a weighting table which is composed of a plurality of weighting factors. The weighting table is the same as the embodiment described above, not repeat it again here.

Continue the above description, multiple virtual beams are produced between two adjacent base beams, every two virtual beams of the multiple virtual beams which cross together at a specific angle are defined to a virtual beam set. If number of antenna 20 is N, the variable number of the multiple virtual beams produced between two adjacent base beams is M. The total number of the multiple virtual beams produced by digital beamforming module 30 is K, wherein K=(N−1)×M where N, M and K are positive. Among K virtual beams produced by digital beamforming module 30, every two virtual beams of the multiple virtual beams which cross together at a specific angle. For example, The $k^h$ and $(k^{+2})^{th}$ virtual beams which cross together at a specific angle are defined to a virtual beam set [k=1~(K−2), thereby producing (K−2) virtual beam sets.

After K virtual beams are define to (K−2) virtual beam sets, the monopulse synthesizer 40 synthesizes each of (K−2) virtual beam sets to a sum pattern ($\Sigma$) and difference pattern ($\Delta$). And then, using quasi-monopulse technique, monopulse synthesizer 40 synthesizes the (K−2) pairs of sum pattern ($\Sigma$) and difference pattern ($\Delta$) to be (K−2) monopulses by computing ratio of $\Sigma/\Delta$. The (K−2) monopulses will point toward specific angle within the detection region. If one of (K−2) monopulses detects the object, the demodulated signal corresponding to the reflected monopulse has maximum amplitude. The processing unit 50 can be a digital signal processing unit. It compares (K−2) demodulated signals of the (K−2) monopulses, wherein the one with maximum magnitude determines the DOA of the object.

In one embodiment, the device for estimating DOA uses multiple-beam antenna system, wherein the radiation pattern is produced by Microstrip antenna. The advantage of Microstrip antenna is: it is a flat structure and easy to be integrated to RF transceiver circuit and other elements so as to reduce influence appearance. The type of antenna is not limited to microstrip antenna, any antenna which can produce appropriate radiation pattern are practical for estimating DOA in the present invention.

Accordingly, the method and device for estimating DOA utilizes digital beam forming and quasi-monopulse technique to estimate DOA of an object. By the characteristic of monopulse's narrow beamwidth and lower side-lobe level, the invention can achieve better angular resolution. In addition, using less antennas can reduce circuit area to reduce cost and overall volume thereof. It is noted, necessary elements such as power module, filter unit, signal amplifier are known to one skilled in the art, and are not discussed here.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for estimating a DOA of an object, comprising:
    providing at least two antennas arranged with a squint angle to produce at least two base beams;
    utilizing a digital beamforming module for producing multiple virtual beams between every two adjacent base beams of the base beams; every two virtual beams of the multiple virtual beams which cross together at a specific angle are defined to a virtual beam set, wherein the two virtual beams is at an interval of one virtual beam;
    utilizing a monopulse synthesizer for synthesizing the two virtual beams of each one of the virtual beam sets to be a monopulse; and
    utilizing a processing unit for determining the DOA of the object according to comparison between magnitude of demodulated signals corresponding to the monopulses.

2. The method for estimating a DOA according to claim 1 further comprising:
    utilizing the digital beamforming module for applying a specific weighting to the two base beams according to the beamwidth and the squint angle of the two base beams to produce multiple virtual beams.

3. The method for estimating a DOA according to claim 2, wherein the specific weighting refers to a weighting table which is composed of a plurality of weighting factors from the digital beamforming module.

4. The method for estimating a DOA according to claim 1, wherein the multiple virtual beams are produced with angle shift between the two adjacent base beams.

5. The method for estimating a DOA according to claim 1, wherein the number of the multiple virtual beams formed by the digital beamforming module is define as K, and K=(N−1)×M, wherein N, M and K are positive integers and N≥2, and N represents the number of the base beams; M is a variable representing the number of the multiple virtual beams produced between two adjacent base beams.

6. The method for estimating a DOA according to claim 5, wherein (K−2) virtual beam sets are produced by the digital beamforming module.

7. The method for estimating a DOA according to claim 1 further comprising:
    utilizing a monopulse synthesizer for producing a sum pattern and a difference pattern by the two virtual beams of each of the virtual beam sets; and
    utilizing a monopulse synthesizer for synthesizing the monopulse by computing a magnitude ratio of the sum pattern and the difference pattern.

8. A device for estimating a DOA of an object, comprising:
    at least two antennas arranged with a squint angle to produce at least two base beams;
    a digital beamforming module, for producing multiple virtual beams between every two adjacent base beams of the base beams, every two virtual beams of the multiple virtual beams which cross together at a specific angle are defined to a virtual beam set, wherein the two virtual beams are at an interval of one virtual beam;

a monopulse synthesizer, for synthesizing the two virtual beams of each one of the virtual beam sets to be a monopulse; and a processing unit, for determining the DOA of the object according to comparison between magnitude of demodulated signals corresponding to the monopulses.

9. The device for estimating a DOA according to claim 8, wherein the antenna is a multi-beam antenna.

10. The device for estimating a DOA according to claim 8, wherein the digital beamforming module applies a specific weighting to the two base beams according to beamwidth and the squint angle of the two base beams.

11. The device for estimating a DOA according to claim 10, wherein the specific weighting refers to a weighting table which is composed of a plurality of weighting factors.

12. The device for estimating a DOA according to claim 8, wherein the multiple virtual beams are produced with angle shift between the two adjacent base beams.

13. The device for estimating a DOA according to claim 8, wherein the number of the multiple virtual beams formed by the digital beamforming module is define as K, and K=(N−1)×M, wherein N, M and K are positive integers and N≥2, and N represents the number of the base beams; M is a variable representing the number of the multiple virtual beams produced between two adjacent base beams.

14. The device for estimating a DOA according to claim 8, wherein (K−2) beam sets are produced by the digital beamforming module.

15. The device for estimating a DOA according to claim 8, wherein the method of synthesizing the monopulse by the monopulse synthesizer comprising:
producing a sum pattern and a difference pattern by the two virtual beams of each of the virtual beam sets; and
synthesizing the monopulse by computing magnitude ratio of the sum pattern and the difference pattern.

* * * * *